US007927511B2

(12) United States Patent
Giering et al.

(10) Patent No.: US 7,927,511 B2
(45) **Date of Patent: *Apr. 19, 2011**

(54) CODING SYSTEM FOR VALUE DOCUMENTS

(75) Inventors: Thomas Giering, Kirchseeon (DE); Wolfgang Rauscher, München (DE)

(73) Assignee: Giesecke & Devient GmbH, Munich (DE)

( * ) Notice: Subject to any disclaimer, the term of this patent is extended or adjusted under 35 U.S.C. 154(b) by 470 days.

This patent is subject to a terminal disclaimer.

(21) Appl. No.: 10/574,831

(22) PCT Filed: Oct. 5, 2004

(86) PCT No.: PCT/EP2004/011133

§ 371 (c)(1), (2), (4) Date: Dec. 19, 2006

(87) PCT Pub. No.: WO2005/035271

PCT Pub. Date: Apr. 21, 2005

(65) Prior Publication Data

US 2007/0202352 A1 Aug. 30, 2007

(30) Foreign Application Priority Data

Oct. 8, 2003 (DE) .................................. 103 46 687

(51) Int. Cl.
*C09K 11/00* (2006.01)
*B24D 15/00* (2006.01)

(52) U.S. Cl. ......... 252/301.36; 252/301.16; 252/301.33; 252/301.34; 252/301.35; 283/92; 428/690; 106/31.64; 106/31.15; 106/31.32

(58) Field of Classification Search ............. 252/301.16, 252/301.33, 301.34, 301.35, 301.36; 283/92; 428/690; 106/31.64, 31.15, 31.32
See application file for complete search history.

(56) References Cited

U.S. PATENT DOCUMENTS

| | | | | |
|---|---|---|---|---|
| 4,013,490 | A * | 3/1977 | Ryan et al. | 149/2 |
| 4,202,491 | A * | 5/1980 | Suzuki | 235/491 |
| 4,451,530 | A | 5/1984 | Kaule et al. | |
| 4,452,843 | A | 6/1984 | Kaule et al. | |
| 5,542,971 | A | 8/1996 | Auslander et al. | |
| 5,763,891 | A * | 6/1998 | Yoshinaga et al. | 250/459.1 |
| 5,897,746 | A | 4/1999 | Attenberger et al. | |
| 6,344,261 | B1 * | 2/2002 | Kaule et al. | 428/195.1 |
| 6,380,547 | B1 * | 4/2002 | Gonzalez et al. | 250/458.1 |
| 6,936,138 | B2 | 8/2005 | Attenberger et al. | |
| 6,974,623 | B2 | 12/2005 | Schwenk | |
| 7,175,739 | B2 | 2/2007 | Attenberger et al. | |
| 2003/0104176 | A1 | 6/2003 | Schwenk | |
| 2004/0105962 | A1 | 6/2004 | Giering et al. | |

FOREIGN PATENT DOCUMENTS

| | | |
|---|---|---|
| DE | 101 20 818 | 10/2002 |
| EP | 0 052 624 | 6/1982 |
| EP | 0 053 124 | 6/1982 |
| EP | 0 066 854 | 12/1982 |
| EP | 0 659 935 | 6/1995 |
| EP | 1 182 048 | 2/2002 |
| WO | WO 01/48311 | 7/2001 |
| WO | WO 02/070279 | 9/2002 |

* cited by examiner

*Primary Examiner* — C. Melissa Koslow
(74) *Attorney, Agent, or Firm* — Bacon & Thomas, PLLC

(57) ABSTRACT

The invention relates to a composition for coding having at least one pair of mutually associated luminescent substances having first and second luminescent substances which emit in a joint emission range located outside the visible spectral range. The emission spectra of the first and second luminescent substances overlap in at least a subrange of the stated emission range such that the emission spectrum of the first luminescent substance is complemented by the emission spectrum of the second luminescent substance.

36 Claims, 1 Drawing Sheet

CODING SYSTEM FOR VALUE DOCUMENTS

BACKGROUND

A. Field

This invention relates to a coding for objects to be secured.

B. Related Art

To provide a readily machine-readable coding a detectable or observable signal or character for communication) for a security paper it was proposed in the print WO 01/48311 to provide the security paper with at least two types of mottling fibers that differ with regard to their luminescent properties. Only one of the different mottling fibers is in each case located in defined, nonoverlapping partial areas of the security paper, so that the geometric arrangement of the partial areas and the presence or absence of mottling fibers permit a coding to be produced. However, the number of thus producible geometric arrangements is limited due to the very limited space available on a security paper.

On these premises, the invention is based on the problem of proposing a coding with an increased number of coding possibilities.

BRIEF SUMMARY OF THE DISCLOSURE

According to the invention, the coding is in the form of a composition and has at least one pair of mutually associated luminescent substances, each pair including first and second luminescent substances which emit in a joint emission range located outside the visible spectral range. The emission spectra of the first and second luminescent substances overlap in at least a subrange of the stated emission range such that the emission spectrum of the first luminescent substance is complemented characteristically by the emission spectrum of the second luminescent substance. That is, the spectrum of luminescence emissions of the first luminescent substance overlaps in a subrange with a subrange of the spectrum of luminescence emissions of the second luminescent substance to define a joint or resultant emission range or in other words, an envelope of luminescence emissions, that is detectable or observable as a combination of the two emission spectra, such that each of the first and second luminescent substances can be said to complement or mutually complement the other to produce the whole of the joint emission range or envelope of luminescence emissions. This provides a high-quality and high-security coding in which the spectral resolution of the mutually complementary luminescence emissions can only be obtained with great technical effort. At the same time, a large number of codings can be produced by the multiplicity of possible pairs of luminescent substances.

In an advantageous embodiment, the joint emission range of the two luminescent substances extends from about 750 nm to about 2500 nm, preferably from about 800 nm to about 2200 nm, particularly preferably from about 1000 nm to about 1700 nm. If the luminescence emission relevant for the coding is in the range above about 1000 nm, it is excluded from comparatively simple detection by commercially available silicon-based infrared detectors.

In a preferred embodiment, the first and/or second luminescent substance is formed on the basis of a doped host lattice. Said luminescent substances can be excited e.g. by irradiating directly into the absorption bands of the luminescent ions and the latter thereupon emitting. In preferred variants it is also possible to use absorbent host lattices or so-called sensitizers which absorb the excitation radiation and transfer it to the luminescent ion which then itself emits with its characteristic wavelengths. Obviously, the host lattices and/or the dopants can be different for the two luminescent substances, in order to obtain different excitation and/or emission ranges.

In a preferred embodiment, the host lattice absorbs in the visible spectral range and optionally additionally in the near infrared range up to about 1.1 μm. Excitation can then be performed with high effectiveness by light sources, such as halogen lamps, flash lamps, LEDs, lasers or xenon arc lamps, so that only small amounts of the luminescent substance are required. The small amount of substance impedes detection of the used substance by potential forgers. If the host lattice absorbs in the near infrared up to about 1100 nm, easily detectable emission lines of the dopant ions can be suppressed, leaving only the emission at larger wavelengths that is more elaborate to detect.

In an alternative preferred embodiment, luminescent substances are used that absorb even in the visible spectral range, preferably over most of the visible spectral range, especially preferably into the near infrared region. Then, too, emissions in these more easily accessible spectral ranges are suppressed.

In an advantageous variant of the inventive coding, the first and/or second luminescent substance is a luminescent substance based on a host lattice doped with rare earth elements. Dopants that can be used here are in particular neodymium, erbium, holmium, thulium, ytterbium, praseodymium, dysprosium or a combination of said elements.

According to another advantageous variant, the first and/or second luminescent substance is a luminescent substance based on a host lattice doped with a chromophore, the chromophore being selected from the group of scandium, titanium, vanadium, chromium, manganese, iron, cobalt, nickel, copper and zinc. The dopants and host lattices stated in WO 02/070279 are also suitable for use as luminescent substances in inventive codings. At least one of the host lattices can be doped with a plurality of chromophores. Obviously, the two variants can be combined, i.e. one of the luminescent substances formed on the basis of a rare earth doped host lattice, the other luminescent substance on the basis of a host lattice with a chromophore.

The host lattice can have for example a perovskite structure or a garnet structure. At least one of the host lattices can also be formed by a mixed crystal. Further possible embodiments of the host lattices and the dopants are specified in EP-B-0 052 624 or EP-B-0 053 124, whose disclosures are included in the present application in this respect.

According to a preferred embodiment of the inventive coding, the first and second luminescent substances are formed on the basis of different host lattices which have crystal fields of different strength and which are each doped with the same dopant. The influence of the crystal field at the site of the dopant causes its electronic levels to be shifted relative to the undisturbed state. Since the amount of shift varies for the different levels, shifts result in the energy intervals of the electronic levels and thus also in the position of the emission lines, depending on the strength and symmetry of the crystal field. If the same dopant is selected for the first and second luminescent substances, small shifts of the associated emission lines relative to the undisturbed emission can be adjusted in controlled fashion by a suitable choice of host lattices with crystal fields of different strength.

The stated subrange where the luminescence spectra of the first and second luminescent substances complementarily overlap (i.e., where the luminescence emissions overlap to produce a combined or resultant luminescence emission, with the first and second substances complementing the other to produce the resultant emission) preferably has a width of 200 nm or less, preferably 100 nm or less. In a preferred embodiment, the subrange extends from about 850 nm to about 970 nm. In other, likewise advantageous embodiments, the subrange extends from about 920 nm to about 1060 nm, or from about 1040 nm to about 1140 nm, or from about 1100 nm to about 1400 nm, preferably from about 1100 nm to about 1250 nm, particularly preferably from about 1120 nm to about 1220 nm, or from about 1300 nm to about 1500 nm, or from about 1400 nm to about 1700 nm.

The first and second luminescent substances advantageously have in the stated subrange at least one emission line in each case whose positions have a distance apart of about 50 nm or less, preferably about 30 nm or less, particularly preferably about 20 nm or less, very particularly preferably about 10 nm or less. Such a small distance between the emission lines considerably impedes detection that two different luminescent substances are present. In preferred embodiments, the emission lines are narrowband and have in particular a half-width of about 50 nm or less, preferably about 30 nm or less, particularly preferably about 20 nm or less, very particularly preferably about 10 nm or less.

According to an advantageous development of the invention, the coding contains a further or third luminescent substance which has at least one emission line outside the stated subrange. The emission line is preferably outside the visible spectral range, in particular in the infrared spectral range above 1100 nm. "Infrared spectral range" is understood according to the invention to be the wavelength range from 750 nm and more, preferably 800 nm and more.

The coding can also have a plurality of pairs of mutually associated luminescent substances which can each be formed as described. The pairs of luminescent substances are preferably coordinated with each other such that the subranges where the emission spectra of the two luminescent substances complementarily overlap are different for different pairs.

It is also possible to provide still further luminescent substances which further complement the inventive pair of luminescent substances to form a combined or resultant emission spectrum. Thus, the additional luminescent substances can emit in the same subrange of the spectrum and further complement the emission spectrum of the inventive pair of luminescent substances.

By variations and combination of the different dopants and host lattices it is possible to produce a multiplicity of pairs of luminescent substances or luminescent substance mixtures whose emission lines relevant for the coding overlap complementarily in different spectral subranges in each case. This permits very compact codings to be formed which occupy little space on the object to be secured while having high information density. The coding can be formed by the presence or absence of single or several luminescent substances within the inventive subrange of the emission spectrum or else of single or several luminescent substances in different subranges.

Objects to be secured may be in particular value documents, such as bank notes, shares, bonds, certificates, coupons, checks, high-quality admission tickets, credit cards, identity cards, passports and other identification documents, and security papers for producing such value documents.

At least one of the luminescent substances can be printed on the value document. A plurality of the luminescent substances, for example a pair of mutually associated luminescent substances, can also be printed on the value document jointly in a printing ink. The printing inks used for this purpose can be transparent or contain additional coloring pigments which must not impair detection of the luminescent substances. They preferably have transparent areas in the excitation range and the viewed emission range of the luminescent substances.

The value document preferably comprises a substrate which is formed by a printed or unprinted cotton fiber paper, a cotton/synthetic fiber paper, a cellulosic paper or a coated, printed or unprinted plastic film. A laminated multilayer substrate can also be used.

One or more of the luminescent substances can also be incorporated into the volume of the value document, in particular the value document substrate. Incorporating the luminescent substances into the volume of a paper substrate can be done for example by a method as described in the prints EP-A 0 659 935 and DE 101 20 818. The disclosures of the stated prints are included in the present application in this respect.

Alternatively, the luminescent substances can also be added randomly to the paper stock before sheet formation.

DESCRIPTION OF THE DRAWINGS

A further embodiment and advantages of the invention will be explained hereinafter with reference to the figures. For clarity's sake, the representation in the figures is not true to scale or to proportion.

The figures are described as follows:

FIG. 1 shows an object, for example, a value document 10, to be secured which is provided with a coding 11 according to one embodiment of the invention.

DETAILED DESCRIPTION OF PREFERRED EMBODIMENTS OF THE INVENTION

Figure 1:
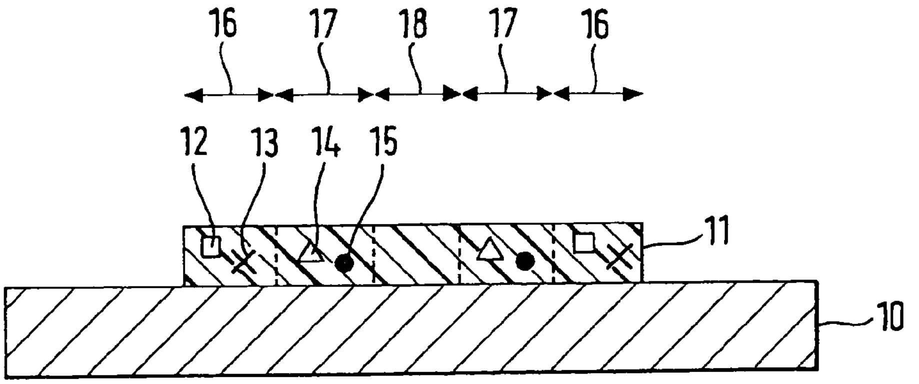
FIG. 1 a schematic representation of an object to be secured having a coding according to one embodiment of the invention, and FIG. 2 schematic emission patterns of different luminescent substances as can be used for the coding of FIG. 1.

The coding 11 contains two pairs of mutually associated luminescent substances 12, 13 and 14, 15 as described above which, after excitation, show emissions in the infrared spectral range between 1000 and 1500 nm which overlap each other complementarily in each case in a subrange, as described more closely hereinafter. The arrangement of areas 16 with the first pair of luminescent substances 12, 13, areas 17 with the second pair of luminescent substances 14, 15 and areas 18 without luminescent substances along given geometric patterns permits any information, for example a product code, to be represented by the coding 11.

Figure 2:
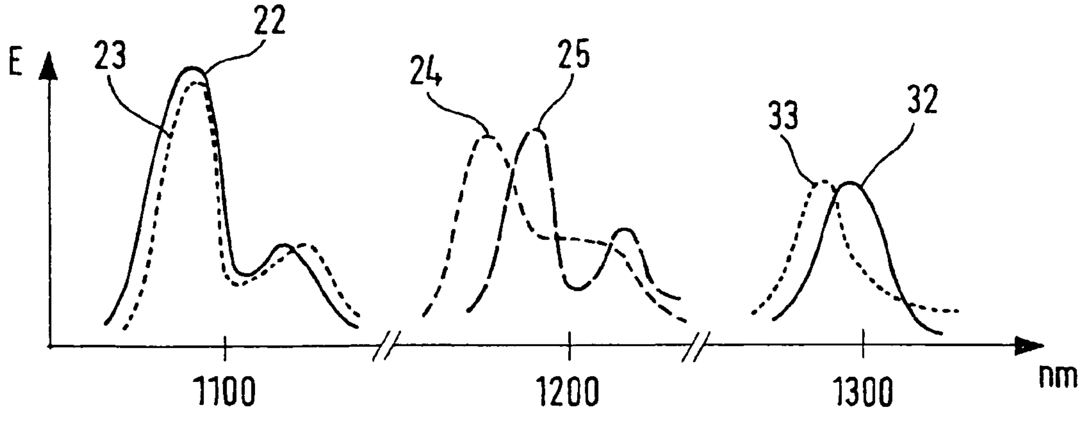

The first pair of luminescent substances comprising first and second luminescent substances 12 and 13 are each formed on the basis of a neodymium doped host lattice and each have an emission line in the range around 1064 nm, as shown in the left-hand part of FIG. 2. The two luminescent substances 12, 13 are formed on the basis of different host lattices, however, which produce crystal fields of different strength at the site of the neodymium ion.

The interaction between the crystal field and the neodymium ions results for the two luminescent substances, as explained above, in emission lines 22 or 23 that are slightly shifted relative to the undisturbed value. In the embodiment, the peak position of the luminescence pattern 22 of the first luminescent substance 12 is at a wavelength of 1065 nm and the peak position of the luminescence pattern 23 of the second luminescent substance 13 at about 1090 nm.

As can be clearly seen in FIG. 2, the two luminescence spectra 22, 23 overlap each other in the subrange from about 1000 nm to about 1150 nm such that the emission spectrum 22 of the first luminescent substance 12 is complemented by the emission spectrum 23 of the second luminescent substance 13. Due to the small distance between the two lines, the presence of the two luminescent substances 12 and 13 is practically unrecognizable from the envelope emission curve without previous knowledge of the substances used, so that the coding has high falsification security. Since the spectrum is produced by different matrices in which the luminescence ions are located in different crystal fields, there are no matrices that, taken alone, produce the same emission spectrum.

The middle part of FIG. 2 shows the emission patterns 24 and 25 of the second pair of luminescent substances including first and second luminescent substances 14 and 15 in the subrange relevant for them at wavelengths from 1150 to 1250 nm. In this embodiment, the first and second luminescent substances 14, 15 are each formed on the basis of a host lattice doped with a chromophore, the chromophore being selected from the group of scandium, titanium, vanadium, chromium, manganese, iron, cobalt, nickel, copper and zinc. As with the first pair of luminescent substances, it is practically impossible to derive the type of luminescent substances used from the envelope of the luminescence emissions of the two luminescent substances 14, 15 without further information.

As a further example, the right-hand part of FIG. 2 shows the luminescence emission of the above-mentioned luminescent substances 12 and 13 at a wavelength of about 1300 nm. Here, too, the result is narrow emission lines 32 and 33 located close together whose joint luminescence emission can be separated only by high-resolution detectors.

The coding 11 can also contain, besides the two pairs of luminescent sub-stances 12, 13 and 14, 15, a further (e.g., a third) luminescent substance which shows an emission at a wavelength above 1100 nm after excitation. The emission wavelength is coordinated so as not to fall within the overlapping ranges of the first or second pair of luminescent substances. The presence or absence of the further luminescent substance in certain areas can likewise be used for coding, thereby further increasing the number of coding possibilities.

The coding shown in FIG. 1 can be used to render for example a ternary code in which the state “0” is represented by an area without luminescent substances, the state “1” by an area with the first pair of luminescent substances 12, 13, and the state “2” by an area with the second pair of luminescent substances 14, 15.

This permits a compact coding which combines high information density with a low space requirement. Obviously, the use of the above-mentioned further luminescent substance or the use of further pairs of luminescent substances of the above-described type permits even denser codings.

The invention claimed is:

1. A composition for forming a security coding, the composition comprising at least one pair of mutually associated luminescent substances, said at least one pair including first and second luminescent substances which emit in a joint emission range located outside the visible spectral range, the emission spectra of the first and second luminescent substances overlapping in at least a subrange of said joint emission range such that the emission spectrum of the first luminescent substance is complemented characteristically by the emission spectrum of the second luminescent substance, wherein the first and second luminescent substances emit in the subrange with respective emission spectra peaks so close as to practically prevent individual recognition of the first and second luminescent substances from an envelope of luminescent emissions defined by the joint emission range without further information, whereby the composition is usable as a security coding.

2. The composition according to claim 1, wherein said joint emission range extends in a range of from about 750 nm to about 2500 nm.

3. The composition according to claim 1, wherein at least one of the first and second luminescent substance is formed on the basis of a doped host lattice.

4. The composition according to claim 1, wherein at least one of the first and second luminescent substance is formed on the basis of a host lattice doped with rare earth elements.

5. The composition according to claim 4, wherein the host lattice is doped with one or more of dopants selected from the group consisting of neodymium, erbium, holmium, thulium, ytterbium, praseodymium, and dysprosium.

6. The composition according to claim 1, wherein at least one of the first and second luminescent substance is formed on the basis of a host lattice doped with a chromophore, the chromophore being selected from the group consisting of scandium, titanium, vanadium, chromium, manganese, iron, cobalt, nickel, copper and zinc.

7. The composition according to claim 6, wherein at least one of the host lattices is doped with a plurality of chromophores.

8. The composition according to claim 3, wherein at least one of the host lattices is formed by a mixed crystal.

9. The composition according to claim 3, wherein the first and second luminescent substances are formed on the basis of different host lattices which have crystal fields of different strength and which are each doped with the same dopant.

10. The composition according to claim 1, wherein the subrange where the emission spectra of the first and second luminescent substances complementarily overlap has a width of 200 nm or less.

11. The composition according to claim 1, wherein the subrange where the emission spectra of the first and second luminescent substances complementarily overlap extends in a range of from about 850 nm to about 970 nm.

12. The composition according to claim 1, wherein the first and second luminescent substances have in said subrange at least one emission line in each case whose positions have a distance apart of about 30 nm or less.

13. The composition according to claim 1, wherein the coding contains a third luminescent substance which has at least one emission line outside said subrange.

14. The composition according to claim 1, wherein the coding system includes a plurality of pairs of said mutually associated luminescent substances.

15. The composition according to claim 14, wherein the subranges where the emission spectra of the first and second luminescent substances of a pair overlap each other complementarily are different for different pairs of mutually associated luminescent substances.

16. The composition according to claim 1, wherein the coding has at least a third luminescent substance which likewise emits in said subrange, and the emission spectrum of the first and third luminescent substance is complemented characteristically.

17. The composition according to claim 1, wherein said joint emission range extends in the range of from about 800 nm to about 2200 nm.

18. The composition according to claim 1, wherein said joint emission range extends in the range of from about 1000 nm to about 1700 nm.

19. The composition according to claim 1, wherein said joint emission range extends in the range of from about 920 nm to about 1060 nm.

20. The composition according to claim 1, wherein said joint emission range extends in the range of from about 1040 nm to about 1140 nm.

21. The composition according to claim 1, wherein said joint emission range extends in the range of from about 1100 nm to about 1400 nm.

22. The composition according to claim 1, wherein said joint emission range extends in the range of from about 1100 nm to about 1250 nm.

23. The composition according to claim 1, wherein said joint emission range extends in the range of from about 1120 nm to about 1220 nm.

24. The composition according to claim 1, wherein said joint emission range extends in the range of from about 1300 nm to about 1500 nm.

25. The composition according to claim 1, wherein said joint emission range extends in the range of from about 1400 nm to about 1700 nm.

26. A value document comprising a composition forming a security coding, said composition comprising at least one pair of mutually associated luminescent substances, said at least one pair including first and second luminescent substances which emit in a joint emission range located outside the visible spectral range, the emission spectrum of the first and second luminescent substances overlapping in at least a subrange of the said joint emission range such that the emission spectrum of the first luminescent substance is complemented characteristically by the emission spectrum of the second luminescent substance, wherein the first and second luminescent substances emit in the subrange with respective emission spectra peaks so close as to practically prevent individual recognition of the first and second luminescent substances within an envelope of luminescent emissions defined by the joint emission range without further information, whereby the composition is usable as a security coding for the document.

27. The value document according to claim 26, said composition comprising at least two pairs of said mutually associated luminous substances.

28. The value document according to claim 26, wherein said joint emission range extends in the range of from about 800 nm to about 2200 nm.

29. The value document according to claim 26, wherein said joint emission range extends in the range of from about 1000 nm to about 1700 nm.

30. The value document according to claim 26, wherein said joint emission range extends in the range of from about 920 nm to about 1060 nm.

31. The value document according to claim 26, wherein said joint emission range extends in the range of from about 1040 nm to about 1140 nm.

32. The value document according to claim 26, wherein said joint emission range extends in the range of from about 1100 nm to about 1400 nm.

33. The value document according to claim 26, wherein said joint emission range extends in the range of from about 1100 nm to about 1250 nm.

34. The value document according to claim 26, wherein said joint emission range extends in the range of from about 1120 nm to about 1220 nm.

35. The value document according to claim 26, wherein said joint emission range extends in the range of from about 1300 nm to about 1500 nm.

36. The value document according to claim 26, wherein said joint emission range extends in the range of from about 1400 nm to about 1700 nm.

* * * * *